US010106689B2

(12) United States Patent
Wolpers et al.

(10) Patent No.: US 10,106,689 B2
(45) Date of Patent: *Oct. 23, 2018

(54) METAL PRETREATMENT COMPOSITIONS COMPRISING SILANES AND ORGANOPHOSPORUS ACIDS

(71) Applicant: HENKEL AG & CO. KGAA, Duesseldorf (DE)

(72) Inventors: Michael Wolpers, Erkrath (DE); Juergen Stodt, Neuss (DE); Uta Sundermeier, Leichlingen (DE); Qi Zhang, Ann Arbor, MI (US); Junjun Wan, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 26 days.

This patent is subject to a terminal disclaimer.

(21) Appl. No.: 15/015,577

(22) Filed: Feb. 4, 2016

(65) Prior Publication Data

US 2016/0152837 A1 Jun. 2, 2016

Related U.S. Application Data

(63) Continuation of application No. PCT/EP2014/066938, filed on Aug. 6, 2014.

(30) Foreign Application Priority Data

Aug. 6, 2013 (DE) ........................ 10 2013 215 441

(51) Int. Cl.
| | | |
|---|---|---|
| C23C 22/07 | (2006.01) | |
| C09D 5/08 | (2006.01) | |
| C23C 22/34 | (2006.01) | |
| C23C 22/36 | (2006.01) | |

(52) U.S. Cl.
CPC .............. *C09D 5/086* (2013.01); *C23C 22/07* (2013.01); *C23C 22/34* (2013.01); *C23C 22/361* (2013.01); *C23C 2222/20* (2013.01)

(58) Field of Classification Search
CPC ................................ C09D 5/086; C23C 22/07
See application file for complete search history.

(56) References Cited

U.S. PATENT DOCUMENTS

| | | | |
|---|---|---|---|
| 6,203,854 B1 | 3/2001 | Affinito | |
| 6,475,300 B2 | 11/2002 | Shimakura et al. | |
| 6,733,579 B1 | 5/2004 | Gorecki | |
| 8,304,092 B2 | 11/2012 | Okai et al. | |
| 2001/0042491 A1 | 11/2001 | Shimakura et al. | |
| 2004/0139887 A1 | 7/2004 | Zhang | |
| 2008/0127859 A1 | 6/2008 | Kolberg et al. | |
| 2008/0138615 A1 | 6/2008 | Kolberg et al. | |
| 2009/0078340 A1 | 3/2009 | Ando et al. | |
| 2011/0008645 A1 | 1/2011 | Schneider et al. | |
| 2011/0076501 A1 | 3/2011 | Dewald et al. | |
| 2011/0100513 A1 | 5/2011 | Schlosser et al. | |
| 2011/0314137 A1 | 12/2011 | Vermoesen | |
| 2013/0177768 A1* | 7/2013 | Kruger .................. | C09D 5/084 428/412 |

FOREIGN PATENT DOCUMENTS

| | | | |
|---|---|---|---|
| CA | 2833367 A1 | 11/2012 | |
| EP | 1130131 A2 | 9/2001 | |
| EP | 1433877 A1 | 6/2004 | |
| EP | 2216371 A1 | 8/2010 | |
| EP | 2284234 A1 | 2/2011 | |
| JP | 56125464 A | 10/1981 | |
| JP | 2006213958 A | 8/2006 | |
| JP | 2007177314 A | 7/2007 | |
| KR | 20110083744 A * | 7/2011 | ............. C09D 5/084 |
| WO | 0046310 A1 | 8/2000 | |
| WO | 0107679 A1 | 2/2001 | |
| WO | 2006076197 A1 | 7/2006 | |
| WO | 2010070728 A1 | 6/2010 | |
| WO | 2011056944 A1 | 5/2011 | |
| WO | WO 2012032102 A1 * | 3/2012 | ............. C09D 5/084 |
| WO | 2012165084 A1 | 12/2012 | |

OTHER PUBLICATIONS

English machine translation of KR 20110083744 A (2011).*
W. J. van Ooij et al.; Tsinghua Science and Technology, "Corrosion Protection Properties of Organofunctional Silanes—An Overview", vol. 10, No. 6, Dec. 2005, pp. 639-664.
International Search Report for International application PCT/EP2014/066938, dated Nov. 3, 2014. All references cited in the International Search Report are listed herein.
International Search Report for International application PCT/EP2014/066935, dated Nov. 3, 2014. All references cited in the International Search Report are listed herein.
W. J. van Ooij et al.; Tsinghua Sci. and Tech., 10(6), Dec. 2015, pp. 639-664.

* cited by examiner

*Primary Examiner* — Peter F Godenschwager
(74) *Attorney, Agent, or Firm* — Mary K. Cameron

(57) ABSTRACT

The object of the underlying invention consists of an acidic aqueous metal pretreatment solution that comprises amino-functional organosilanes and organophosphorus acids. These types of metal pretreatment solutions effectively reduce temporary corrosion when applied to metal surfaces and in addition confer good adhesion properties for subsequently coated organic lacquers. The invention consequently also encompasses a process for the treatment of metal substrates, especially selected from zinc and zinc-coated steel substrates, wherein metal pretreatment solutions of this invention are applied.

18 Claims, No Drawings

METAL PRETREATMENT COMPOSITIONS COMPRISING SILANES AND ORGANOPHOSPORUS ACIDS

FIELD OF INVENTION

The object of the underlying invention consists of an acidic aqueous metal pretreatment solution that comprises amino-functional organosilanes and organophosphorus acids. These types of metal pretreatment solutions effectively reduce temporary corrosion when applied to metal surfaces and in addition confer good adhesion properties for subsequently coated organic lacquers. The invention consequently also encompasses a process for the treatment of metal substrates, especially selected from zinc and zinc-coated steel substrates, wherein metal pretreatment solutions of this invention are applied.

BACKGROUND OF THE INVENTION

Anticorrosion agents for metal surfaces that include an acidic aqueous solution of fluoro complexes have long been known. They are increasingly employed as a replacement for chromating processes which, due to the toxicological properties of chromium compounds, are less and less used. Generally, solutions of fluoro complexes of this type contain additional anticorrosion agents that further improve corrosion protection and paint adhesion. Nevertheless, different attempts have been made in the prior art to passivate metal surfaces and thereby to condition metal surfaces for the application of further coatings.

WO 0046310 for example discloses water based compositions suitable for the corrosion-resistant treatment of metal surfaces, wherein the compositions are composed of condensable amino-functional silanes and polysilanes. According to this teaching, these types of compositions are to be applied on the metal surface and dried thereupon.

JP 56125464 relates to the formation of wear-resistant coatings on metal surfaces based on curable compositions that are composed of organosilanes and silane-functional epoxy resins.

EP 2284234 A1 teaches a pretreatment for the temporary corrosion protection of metal coils based on condensated organosilanes that additionally improve the deep drawing properties of the as treated coils. In this respect such metal treatment solutions are disclosed that contain a mixture of organosilanes that are at least partially comprised of amino-functional organosilanes, and diols of polyethers, polyesters and/or polycarbonates.

EP 2216371 discloses corrosion-resistant thin coatings based on aqueous compositions of silicates and hydrolyzable organosilanes and which are suitable for high-temperature applications. These compositions have a low volatile organic content.

EP1433877 teaches aqueous compositions for the passivation of metal surfaces suitable for the application of an organic electrocoating. The compositions disclosed therein are mixtures of an amino-functional organosilane and water-soluble compounds of the elements Zr, Ti and/or Hf, whilst an amount of dissolved fluorides is mandatory.

BRIEF SUMMARY OF THE INVENTION

Despite these manifold compositions for the corrosion-resistant treatment of metals which are already known in the prior art, there still exists a need to further improve the properties of the passivation layer conferred to the metal surface in the processes of the prior art. Especially, there is a need to establish stable water-based compositions based on organosilanes which are capable of efficiently passivating metal surfaces and which contain only small amounts of transition metal elements.

The problem of the underlying invention that is to be solved therefore consists in establishing an aqueous composition based on organosilanes suitable for forming a highly protective coating on bare metal surfaces. Such an aqueous composition of the invention shall when applied to a bare metal substrate provide a high corrosion resistance of the as coated metal substrate and shall additionally confer improved adhesion of further applied organic coatings. Furthermore, the aqueous composition has to comprise the organosilanes in an amount sufficient to yield a homogenous protective coating after drying of a wet film of the aqueous composition being applied by conventional means to the bare metal surface. Such an aqueous composition should be stable against gelification caused by condensation of the organosilanes, so that an adequate shelf lifetime of the aqueous composition is guaranteed. Moreover, such an aqueous composition shall comprise only minor amounts of transition metal elements.

It was surprisingly found that an acid aqueous solution of organosilanes having at least one non hydrolyzable substituent carrying an amino functional group and organophosphorus acids is stabilized against gelification when the compounds are present in a given ratio range. Moreover, the co-presence of these type of organosilanes and organophosphorus acids gives rise to acidic aqueous solutions that when applied to metal surfaces confer surprisingly good temporary corrosion resistance compared to aqueous solutions comprising organosilanes and conventional acids such as phosphoric acid or acetic acid.

Thus, the first aspect of the invention is an acidic aqueous solution suitable for the pretreatment of metals with a pH in the range from 2.0 to 5.5 comprising:

a) more than 0.2 wt.-% calculated with respect to the element Si of at least one organosilane with at least one hydrolyzable substituent and one to three non hydrolyzable substituents, wherein at least one of the non hydrolyzable substituents carries at least one amino group, and wherein the total number of substituents at each silicium atom of the organosilanes is four, b) at least one organophosphorus acid.

DETAILED SUMMARY OF THE INVENTION

An "organosilane" according to the invention provides a tetravalent silicon atom with four polar covalently bound substituents while at least one covalent Si—C bond is present. Such a covalent Si—C bond always carries a non hydrolyzable substituent. Therefore, in this context a hydrolyzable substituent is by definition not to be bound via such a covalent Si—C bond to the silicon atom of the organosilane.

The skilled person knows that organosilanes when dissolved in water may undergo manifold hydrolysis and self-condensation reactions and are thus in equilibrium with the respective hydrolyzed and condensated species. The feature that the acidic aqueous solution (hereinafter "metal pretreatment solution") shall comprise the organosilane as defined herein is therefore to be understood that a metal pretreatment solution is obtainable by adding the respective organosilane according to component a) to an aqueous solution that may or may not already comprise the other essential component b).

An acidic aqueous solution according to this invention (hereinafter "metal pretreatment solution") may comprise other organosilanes than those that accord with component a). Nonetheless, it is preferred that the total amount of organosilanes calculated with respect to the element Si within the pretreatment solution does not exceed 10 wt.-% in order to prevent gelification and precipitation of the active ingredients. Moreover, the fraction of organosilanes according to compound a) based on the total amount of organosilanes each calculated with respect to the element Si is preferably at least 30 mol-%, more preferably at least 40 mol-% in order to achieve optimum corrosion protection when applied to a bare metal surface.

A metal pretreatment solution according to this invention preferably comprises such organosilanes according to component a) that are selected from compounds according to the following general structure (I):

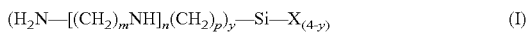

wherein the hydrolyzable substituents X are independently from each other selected from alkoxy groups with not more than 4, preferably not more than 2 carbon atoms;

wherein m and p each independently from another are integer numbers in the range from 1 to 4; wherein n is an integer number in the range from 0 to 8, preferably from 0 to 3; and, wherein y is an integer number in the range from 1 to 3, and preferably y equals to 1.

Accordingly composed pretreatment solutions were found to give rise to highly adherent coatings on bare metal surfaces, especially to steel and zinc-coated steel, and thus to coatings with a superior corrosion protection performance.

Especially preferred in this context are organosilanes according to component a) that are selected from monoaminoalkylalkoxysilanes, such as aminopropyltrimethoxysilane, aminopropyltriethoxysilane, aminoethyltrimethoxysilane, aminoethyltriethoxysilane, aminomethyltrimethoxysilane, aminomethyltriethoxysilane, Aminopropylmethyldimethoxysilane and aminopropylmethyldiethoxysilane; so-called diaminoalkylakoxysilanes, such as aminoethylaminopropyltrimethoxysilane and aminoethylaminopropyltriethoxysilane; and, so-called triaminoalkylalkoxysilanes, such as aminoethylaminoethylaminopropyltrimethoxysilane or aminoethylaminoethylaminopropyltriethoxysilane.

In order to further improve the coating characteristics with respect to the adhesion to further applied organic lacquers, a preferred metal pretreatment solution does additionally comprise organosilanes which are different from component a) and which are preferably selected from organosilanes with at least one hydrolyzable substituent and one to three non hydrolyzable substituents, wherein at least one of the non-hydrolyzable substituents carries at least one hydroxyl or oxirane functional group. These types of organosilanes different from component a) are beneficial for further promoting the adhesion to organic lacquers based on epoxy resins, urethane resins or acrylic resins. Especially preferred in this context are organosilanes selected from (3-Glycidyloxypropyl)trimethoxysilane and/or (3-Glycidyloxypropyl)-triethoxysilane. The fraction of these type of organosilanes carrying at least one hydroxyl or oxirane functional group based on the total amount of organosilanes each calculated with respect to the element Si is preferably at least 10 mol-%, more preferably at least 20 mol-%.

An "organophosporus acid" according to component b) of metal pretreatment solutions of this invention provides at least one phosphorus atom covalently bound to a carbon atom.

In a preferred embodiment of the invention the metal pretreatment solution is characterized by a molar ratio of the amount of organosilanes calculated with respect to the element Si to organophosphorus acids calculated with respect to the element P being with increasing preference at least 0.5, 0.8, 1 and 2, but preferably with increasing preference not more than 5, 4 and 3.

The metal pretreatment solutions preferably contains organophosphorus acids with at least two functional phosphonic acid groups that are bridged via an alkylene, oxyalkylene or aminoalkylene group, wherein the alkylene, oxyalkylene or aminoalkylene bridge may be further substituted with amino, hydroxyl and/or aminoalkyl and/or hydroxyalkyl groups each with not more than 4 carbon atoms. The shortest alkylene bridge that connects two functional phosphonic groups is preferably constituted of not more than 4 carbon atoms.

Representatives of these organophosporus acids are for example etidronic acid or alendronic acid.

In this context, those organophosphorus acids that are selected from α-aminophosphonic acids that accord with the following general formula (II) are especially preferred:

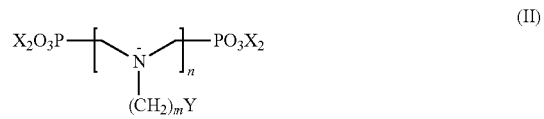

wherein n is an integer number of at least 1, but not more than 5, preferably not more than 3;

wherein m is an integer number of at least 1, but not more than 5;

wherein the substituent Y is selected from —P(=O)(OX)$_2$, —OH und —NH$_2$, preferably selected from —P(=O)(OX)$_2$ und —OH;

wherein the residues X are independently from each other selected from hydrogen, aliphatic groups with not more than 4 carbon atoms, alkaline metal cations, ammonium or quaternary ammonium cations; and wherein at least one residue X is selected from hydrogen.

In an even more preferred embodiment of this invention the organophosphorus acid of a metal pretreatment solution is selected from α-aminophosphonic acids that accord with the following general formula (III):

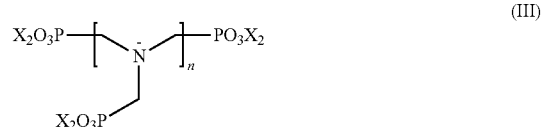

wherein n is an integer number of at least 1, but not more than 5, preferably not more than 3;

wherein the residues X are independently from each other selected from hydrogen, aliphatic groups with not more than 4 carbon atoms, alkaline metal cations, ammonium or quaternary ammonium cations; and wherein at least one residue X is selected from hydrogen.

Especially preferred α-aminophosphonic acids as a component b) in a metal pretreatment solution of this invention are nitrilotris(methylenephosphonic acid), ethylenediaminetetrakis(methylenephosphonic acid) and/or diethylenetriaminepentakis(methylenephosphonic acid) and their alkaline metal, ammonium or quartery ammonium salts.

Metal pretreatment compositions may additionally comprise oxyacids of phosphorus other than the organophosporus acids according to component b) such as phosphorous acid and/or phosphoric acid. It was found that oxyacids of phosphorus are not detrimental to the stability of the metal pretreatment solutions of this invention. In this context, it is even advantageous if the acidity of the metal pretreatment solution is essentially provided by oxyacids of phosphorus. The metal pretreatment solution of this invention preferably has a pH in the range from 2.5 to 4.5, preferably in the range from 2.5 to 4.0. Accordingly, the amount of acids with a $pK_A$ value for the first deprotonation step of above 3.5 is below 0.05 wt.-%, more preferably below 0.01 wt.-% in a preferred metal pretreatment solution. In an even more preferred embodiment the metal pretreatment solution comprises less than 0.05 wt.-%, especially less than 0.01 wt.-% of other acids than oxyacids of phosphorus. Nevertheless it is preferred in order to ensure superior corrosion protective properties of metal surfaces being treated with a solution of this invention that the fraction of organophosphorus acids according to component b) based on the total amount of oxyacids of phosphorus is at least 40 mol-%, more preferably at least 60 mol-%, even more preferably at least 80 mol-% calculated with respect to the element P.

It was found that the corrosion protective properties can be further improved when a coating based on metal pretreatment solutions of this invention, that additionally comprises complex anions of the elements B, Zr, Ti, Hf and/or Si as a component c), is formed on the bare metal surface. Surprisingly, the corrosion protective properties are significantly improved when a relatively small amount of complex anions of the compounds of component c) compared to the overall amount of organosilanes is present in an acidic aqueous solution of this invention.

In this context it is preferred that the molar ratio of the total amount of organosilanes calculated with respect to the element Si to the total amount of complex anions of the elements B, Zr, Ti, Hf and/or Si as a component c) calculated with respect to the elements B, Zr, Ti, Hf and/or Si is in a range from 80 to 500. The corrosion resistance becomes inferior by further increasing the relative amount of complex anions of the compounds of component c) beyond the prescribed value; in fact gelification of the acidic aqueous solutions can be observed if the molar ratio falls below the prescribed lower limit which may as well give rise to the poorer performance with respect to the corrosion resistance. In a preferred embodiment the molar ratio of the total amount of organosilanes calculated with respect to the element Si to complex anions of the elements B, Zr, Ti, Hf and/or Si calculated with respect to the elements B, Zr, Ti, Hf and/or Si is at least 100, preferably at least 120, but in order to ensure an optimum corrosion protection efficiency preferably not higher than 400. For the same reasons given above the total amount of complex anions of the elements Zr, Ti, Hf and/or Si calculated with respect to the elements Zr, Ti, Hf and/or Si is preferably not more than 0.05 wt.-%.

It is further preferred that the acidic aqueous compositions of this invention comprise such complex anions according to component c) that are selected from oxyfluoroanions or fluoroanions of the elements B, Zr, Ti, Hf and/or Si, preferably from oxyfluoroanions or fluoroanions of the elements Zr and/or Ti, more preferably from oxyfluoroanions or fluoroanions of the element Ti. These fluoroanions can be provided by adding fluoroacids of these metals and/or water-soluble salts of hexafluorometallates to an aqueous solution in order to establish a composition of this invention. Oxyfluoroanions can be provided by additionally mixing water-soluble salts of the same metals, such as nitrates and/or carbonates, to an aqueous solution already comprising the fluoroanions according to component c).

The performance of the metal pretreatment solutions of this invention does not depend on the presence of chromium cations that are known in the prior art to effectively furnish bare metal surfaces with a passivating layer. Therefore, it is for economical and environmental reasons preferred that the metal pretreatment solutions of this invention comprise less than 100 ppm, more preferably less than 10 ppm of chromium.

A metal pretreatment solution of this invention is preferably obtainable through a process where at least one organosilane according to component a) is added stepwise to an aqueous solution comprising at least one organophosphorus acid according to component b), while upon addition of the organosilanes according to componenet a) the temperature of the resulting aqueous solution is kept in a range of from 10 C to 60° C.

A preferred pretreatment solution can be obtained through evaporation of the alcohols being released upon addition of the organosilanes according to component a) to the aqueous solution under reduced pressure and/or elevated temperature, preferably until the content of alcohols in the aqueous solution is below 0.1 wt.-%.

A metal pretreatment solution of this invention is capable of providing superior corrosion resistance towards bare metal surfaces. Therefore, the solutions of this invention are suitable for the temporary corrosion protection of metal surfaces. For this purpose metal pretreatment solutions are preferred that comprise less than 0.1 wt.-%, more preferably less than 0.01 wt.-%, even more preferably less than 0.001 wt.-% of organic polymers. The term "organic polymer" in the context of this invention is meant to encompass compounds with a carbon content of at least 60 wt.-% and a weight-average molecular weight of more than 400 g/mol as determined with gel permeation chromatography (GPC).

On the other hand, the presence of organic polymer is not per se detrimental to the corrosion resistance performance. In case that the bare metal surface is to be coated with a permanent corrosion resistant layer that additionally promotes the adhesion to further applied organic lacquers, it is preferred that the metal pretreatment solution additionally comprises at least 0.001 wt.-%, more preferably at least 0.01 wt.-%, and even more preferred at least 0.1 wt.-% of organic polymers. The organic polymers being additionally present in a metal pretreatment solution of this invention are preferably selected from acrylic, epoxy and/or urethane polymers, more preferably from acrylic and/or urethane polymers. In this context it is preferred that the mass fraction of organic polymers in the metal pretreatment composition with respect to the overall amount of organosilanes preferably does not exceed the ratio 3:1 and even more preferably lies within the range of from 1:2 to 2:1.

In order to attain optimum adhesion of a subsequent organic coating to the pretreated metal surface the metal pretreatment solution of this invention preferably comprises silane-functional acrylic, epoxy and/or urethane polymers, more preferably silane-functional urethane polymers. Preferably such silane-functional urethane polymers are a reaction product of a diisocyanate, a polyol and an amino-functional organosilane according to component a) of the pretreatment composition of this invention.

A preferred pretreatment composition of this invention that comprises a silane-functional urethane polymer is obtainable through a process:
  wherein an amount of a diisocyanate is added stepwise to an amount of a polyol being dissolved in an aprotic water-miscible solvent acting as a reaction medium while stirring the reaction medium at a temperature in the range of from 30 to 90° C. for at least 10 minutes and wherein an amount of an organosilane with at least one hydrolyzable substituent and one to three non hydrolyzable substituents, wherein at least one of the non hydrolyzable substituents carries at least one amino group, and wherein the total number of substituents at each silicon atom of the organosilanes is four, is either co-present in the reaction medium or added to the reaction medium after at least 50 wt.-% of the amount of the diisocyanate has been added stepwise to the reaction medium while the temperature is kept in the range of from 30 to 90° C.,
  wherein a portion of the reaction medium comprising the silane-functional urethane polymer is subsequently combined under stirring with a portion of an acidic aqueous solution being greater by volume than the portion of the reaction medium and wherein the acidic aqueous solution comprises:
    a) more than 0.2 wt.-% calculated with respect to the element Si of at least one organosilane with at least one hydrolyzable substituent and one to three non hydrolyzable substituents, wherein at least one of the non hydrolyzable substituents carries at least one amino group, and wherein the total number of substituents at each silicium atom of the organosilanes is four,
    b) at least one organophosphorus acid.

An "aprotic water-miscible solvent" according to this invention does not comprise hydrogen atoms being bound to either nitrogen, oxygen or sulphur, while at least 50 grams of the solvent are miscible in 1000 grams of water at 20° C. A preferred aprotic water-miscible solvent is N-methylpyrrolidone.

In a preferred embodiment, the pretreatment composition of this invention that comprises a silane-functional urethane polymer is obtainable in a process as described above wherein the said organosilane is co-present with the polyol in the reaction medium and the diisocyanate is added stepwise to the reaction medium comprising the organosilane and the polyol.

In a further preferred embodiment, the pretreatment composition of this invention that comprises a silane-functional urethane polymer is obtainable in a process as described above, wherein the molar ratio of the diisocyanates to the polyols within the reaction mixture is from 2:3 to 3:2 and wherein the molar ratio of organosilanes to the polyols within the reaction mixture is from 1:3 to 2:3.

Where a pretreatment composition of this invention is obtained through a process as defined above, the polyol being dissolved in the reaction medium is preferably selected from alkanediols with not more than 8, more preferably not more than 6 carbon atoms and/or from polyalkylene glycols with not more than 5 oxyalkylene groups, wherein the alkylene is preferably selected from butylene, propylene and/or ethylene.

Where a pretreatment composition of this invention is obtained through a process as defined above the diisocyanate being added stepwise to the reaction medium is preferably selected from aliphatic diisocyanates with not more than 8, more preferably not more than 6 carbon atoms.

Where a pretreatment composition of this invention is obtained through a process as defined above the organosilane being either co-present in the reaction medium or being at least partially added to the reaction medium after the diisocyanate has been added stepwise is preferably selected from those organosilanes that accord with preferred organosilanes being described herein in detail with regard to component a) of the metal pretreatment solution.

The invention further encompasses a process for the corrosion-resistant treatment of metals wherein a metal substrate is brought into contact with a metal pretreatment solution according to this invention. For this second aspect of the underlying invention, the means for bringing the metal pretreatment solution into contact with the metal substrate are not critical and may be selected from immersion, spraying, roller-coating and squeegee-coating techniques.

Where the pretreatment process is conducted to provide metal surfaces with a temporary corrosion protection, it is preferred that the metal pretreatment solution comprises less than 0.1 wt.-% of organic polymers. In this context it is further preferred that contacting the metal substrate with a metal pretreatment solution of this invention gives rise to a wet film thickness that after drying yields an elemental loading with respect to the element Si in a range of 5 to 150 mg/m$^2$, preferably in a range of 40 to 100 mg/m$^2$. The elemental loading can be determined based on X-ray fluorescence spectroscopy (XRF).

On the other hand, if the pretreatment process is conducted to provide metal surfaces with a corrosion protective coating that is to be further coated with an organic lacquer the metal pretreatment solution preferably comprises at least 0.1 wt.-% of an organic polymer, said polymer being preferably selected from those organic polymers as specified above. In this context it is further preferred that contacting the metal substrate with a metal pretreatment solution of this invention gives rise to a wet film thickness that after drying yields a dry coating thickness in a range of from 0.3 to 3 μm, preferably in a range of from 0.5 to 2 μm.

A preferred process for the corrosion-resistant treatment of metals is characterized in that a metal substrate is first brought into contact with a metal pretreatment solution according to this invention, wherein the metal pretreatment composition further comprises at least 0.1 wt.-% of an organic polymer being selected from urethane and/or acrylic polymers and secondly with or without intermediate rinsing and drying step further coated with an organic lacquer, preferably selected from powder lacquers or dipping paints. In a preferred embodiment of this process wet film after contacting the metal substrate with the metal pretreatment composition comprising the organic polymers is dried while such a wet film thickness of the metal pretreatment solution is applied that upon drying a dry coating thickness in the range of from 0.3 to 3 μm is obtained. In an even more preferred embodiment of such a process of this invention, the organic lacquer is applied in such a way that an overall coating thickness in the range of from 10 to 100 μm is obtained.

The metal substrate to be brought into contact with a pretreatment solution of this invention is preferably selected from aluminum, zinc, iron and their alloys, as well as from steel and zinc coated steel; zinc and zinc-coated steel surfaces are especially preferred.

The type of metal substrate in the context of this invention is not limited although flats like metal coils or metal sheets are preferred as they can be easily coated with a homogeneous wet film of a metal pretreatment solution of this invention that, according to a preferred process of this invention, is to be dried to yield a thin corrosion protective coating on the bare metal surface.

EXAMPLES

Acidic aqueous metal pretreatment solutions (PTS) are prepared following the general routine of adding a mixture of organosilanes (MOS) dropwise to an acidic aqueous solution (AAS) under stirring whilst the temperature is kept at 42° C. After addition of the organosilanes (MOS) to the acidic aqueous solution (AAS) the resulting reaction mixture is stirred for 15 minutes at 50° C. A portion of water is then added to this reaction mixture and the amount of alcohols being released upon the condensation and hydrolyzation of the organosilanes is reduced to less than 0.1 wt.-% under reduced pressure to yield a concentrate of the respective acidic aqueous metal pretreatment solution. Table 1 depicts the specific composition of concentrates of metal preatreatment solutions (PTS) being prepared according to the aforementioned general routine.

TABLE 1

Composition [1] of concentrates of acidic metal pretreatment solutions

| | MOS | | | AAS | | | |
|---|---|---|---|---|---|---|---|
| No. | AMEO | GLYMO | PTMO | $H_3PO_4$ | HCOOH | ATMP | HEDP | $H_2O$ |
| 1 | 17.6 | 18.9 | 13.2 | 11.3 | — | — | | 112.2 |
| 2 | 17.6 | 18.9 | 13.2 | — | 4.5 | — | | 112.2 |
| 3 | 17.6 | 18.9 | 13.2 | — | — | 30 | | 112.2 |
| 4 | 17.6 | 18.9 | 13.2 | — | — | — | 33 | 112.0 |

AMEO: 3-aminopropyltriethoxysilane
GLYMO: glycidoxypropyltrimethoxysilane
PTMO: trimethoxypropylsilane
$H_3PO_4$: 85 wt.-% phosphoric acid
HCOOH: 98 wt.-% acetic acid
ATMP: 50 wt.-% aminotri(methylene phosphonic acid)
HEDP: 60 wt.-% etidronic acid
$H_2O$: deionised water with κ < 1 μScm$^{-1}$
[1] all values given in grams In order to attain the metal pretreatment solution (PTS), 150 grams of the respective concentrate of Table 1 was diluted with 350 grams of deionised water (κ<1 μScm$^{-1}$). These metal pretreatment solutions were then applied with a roller coater to zinc coated steel plates (HDG) in a wet film thickness so that a theoretical elemental loading of 60 mg/m$^2$ of Si was provided. The as treated zinc coated steel plates were thereafter dried in an oven at 50° C. for 10 seconds. The corrosion resistant properties of the zinc coated steel plates being coated as described herein was determined based on the white rust appearance after exposure to Salt-Spray-Test, Condensation-Climate-Test and Condensate-Stack-Corrosion-Test. These results are summarized in Table 2.

TABLE 2

White rust appearance of zinc coated steel plates treated with working solutions of Tab. 1

| | SST [1] | | CCT [2] | | Stack-Test [3] | |
|---|---|---|---|---|---|---|
| No. | WR/% | Time/h | WR/% | Time/h | WR/% | Time/h |
| 1 | 3 | 96 | 3 | 21 | 0 | 10 |
| 2 | 30 | 48 | 30 | 21 | 15 | 10 |
| 3 | 0 | 96 | 0 | 21 | 0 | 10 |
| 4 | 0 | 96 | 0 | 21 | 0 | 10 |

[1] exposed according to DIN-EN ISO 9227
[2] exposed according to DIN-EN ISO 6270-2 AT
[3] stack of 9 steel plates exposed according to DIN-EN ISO 6270-2 AT; assessment of the 5$^{th}$ steel plate
WR: area percentage of white rust appearance It is obvious from Table 2, that the metal pretreatment solution of this invention comprising the organophosphorus acids (No. 3 and 4) give the best protection against white rust formation compared to those solutions comprising phosphoric (No. 1) or acetic acid (No. 2).

The invention claimed is:

1. An acidic aqueous metal pretreatment solution with a pH in the range from 2.5 to 5.5 comprising:

a) more than 0.2 wt.-% calculated with respect to the element Si of at least one organosilane with at least one hydrolyzable substituent and one to three non hydrolyzable substituents, wherein at least one of the non hydrolyzable substituents carries at least one amino group, and wherein the total number of substituents at each silicon atom of the organosilanes is four;

b) at least one organophosphorus acid; and c) at least one complex anion of the elements B, Zr, Hf and/or Si;

wherein c) is present in an amount such that a molar ratio of a total amount of organosilanes calculated with respect to the element Si to a total amount of complex anions of the elements B, Zr, Ti, Hf and/or Si calculated with respect to the elements B, Zr, Ti, Hf and/or Si is in a range from 80 to 500.

2. The metal pretreatment solution according to claim 1, wherein the fraction of organophosphorus acids based on the total amount of oxyacids of phosphorus is at least 60 mol-% calculated with respect to the element P.

3. The metal pretreatment solution according to claim 1, wherein the organophosphorus acids are selected from α-aminophosphonic acids that accord with the general formula (II):

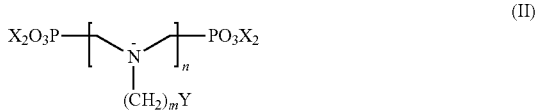 (II)

wherein n is an integer number of at least 1, but not more than 5; wherein m is an integer number of at least 1, but not more than 5; wherein the substituent Y is selected from —P(=O)(OX)$_2$, —OH or —NH$_2$; wherein the residues X are independently from each other are selected from hydrogen, aliphatic groups with not more than 4 carbon atoms, alkaline metal cations, ammonium or quaternary ammonium cations; and wherein at least one residue X is selected from hydrogen.

4. The metal pretreatment solution according to claim 1, wherein the molar ratio of the amount of organosilanes calculated with respect to the element Si to organophosphorus acids calculated with respect to the element P is at least 0.5:1 and not more than 5:1.

5. The metal pretreatment solution according to claim 1, further comprising other organosilanes different from a) wherein said other organosilanes comprise d) organosilanes having at least one hydrolyzable substituent and one to three non hydrolyzable substituents, wherein at least one of the non-hydrolyzable substituents carries at least one hydroxyl or oxirane functional group; wherein the total amount of organosilanes calculated with respect to the element Si is not more than 10 wt.-% and wherein the fraction of organosilanes according to compound a) calculated with respect to the element Si based on the total amount of organosilanes calculated with respect to the element Si is at least 30 mol-%; and the fraction of organosilanes according to compound d) calculated with respect to the element Si based on the total amount of organosilanes is at least 20 mol-%.

6. The metal pretreatment solution according to claim 1, wherein the at least one organosilane according to component a) is selected from compounds according to the following general structure (I):

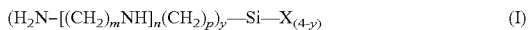 (I)

wherein the hydrolyzable substituents X are independently from each other selected from alkoxy groups with not more than 4 carbon atoms;
wherein m and p each independently from another are integer numbers in the range from 1 to 4; wherein n is an integer number in the range from 0 to 8; and wherein y is an integer number in the range from 1 to 3.

7. The metal pretreatment solution according to claim 1 additionally comprising organosilanes different from component a) that are selected from organosilanes with at least one hydrolyzable substituent and one to three non hydrolyzable substituents, wherein at least one of the non hydrolyzable substituents carries at least one hydroxyl or oxirane functional group.

8. The metal pretreatment solution according to claim 7, wherein the fraction of organosilanes with at least one hydrolyzable substituent and one to three non hydrolyzable substituents, wherein at least one of the non hydrolyzable substituents carries at least one hydroxyl or oxirane functional group, calculated with respect to the element Si based on the total amount of organosilanes calculated with respect to the element Si is at least 10 mol-%.

9. The metal pretreatment solution according to claim 1, wherein the at least one complex anion is selected from oxyfluoroanions or fluoroanions of the elements B, Zr, Ti, Hf and/or Si.

10. The metal pretreatment solution according to claim 1, wherein the molar ratio of the total amount of organosilanes calculated with respect to the element Si to the total amount of complex anions of the elements B, Zr, Ti, Hf and/or Si calculated with respect to the elements B, Zr, Ti, Hf and/or Si is in a range from 100 to 400.

11. The metal pretreatment solution according to claim 9, wherein the total amount of complex anions of the elements Zr, Ti, Hf and/or Si calculated with respect to the elements Zr, Ti, Hf and/or Si is not more than 0.05 wt.-%.

12. The metal pretreatment solution according to claim 1, wherein the amount of acids with a pK$_A$ value of above 3.5 for the first deprotonation step is below 0.05 wt.-%.

13. The metal pretreatment solution according to claim 1, containing less than 0.01 wt.-% of organic polymers, wherein the pH of the aqueous acidic composition is in the range from 2.5 to 4.0.

14. The metal pretreatment solution according to claim 1 additionally comprising at least one organic polymer selected from the group consisting of acrylic polymers, urethane polymers, and a combination thereof.

15. A process for a corrosion-resistant treatment of metals, wherein a metal substrate is brought into contact with a metal pretreatment solution as defined in claim 1.

16. The process according to claim 15, wherein the metal substrate is selected from the group consisting of zinc, zinc-coated steel, and a combination thereof.

17. The metal pretreatment solution according to claim 14 wherein the at least one organic polymer comprises a urethane polymer which is a silane-functional urethane polymer that is a reaction product of a diisocyanate, a polyol and the amino-functional organosilane according to component a).

18. An acidic aqueous metal pretreatment solution with a pH in the range from 2.5 to 5.5 and comprising reaction products of a reaction mixture comprising:
a) more than 0.2 wt.-% calculated with respect to the element Si of at least one organosilane with at least one hydrolyzable substituent and one to three non hydrolyzable substituents, wherein at least one of the non hydrolyzable substituents carries at least one amino group, and wherein the total number of substituents at each silicon atom of the organosilanes is four;
b) an aqueous solution of at least one selected from α-aminophosphonic acid and salts thereof; and
c) other organosilanes, different from a), wherein a total amount of organosilanes does not exceed 10 wt.-% and the organosilanes according to a) comprise at least 30 mol-% of the total amount of organosilanes, each calculated with respect to the element Si;
with the proviso that the acidic aqueous metal pretreatment solution contains less than 0.03 wt. % of reaction products that are alcohols released upon the condensation and hydrolyzation of the at least one hydrolyzable substituent on the organosilane.

* * * * *